US010883259B2

(12) United States Patent
Risbey et al.

(10) Patent No.: US 10,883,259 B2
(45) Date of Patent: Jan. 5, 2021

(54) MIXER VALVE HAVING AN ADJUSTMENT SPACER

(71) Applicant: Kohler Mira Limited, Cheltenham (GB)

(72) Inventors: Toby Risbey, Cheltenham (GB); Karl Fearnley, Cheltenham (GB); Ben Lea, Cheltenham (GB)

(73) Assignee: KOHLER MIRA LIMITED

( * ) Notice: Subject to any disclaimer, the term of this patent is extended or adjusted under 35 U.S.C. 154(b) by 39 days.

(21) Appl. No.: 16/319,110

(22) PCT Filed: Jul. 4, 2017

(86) PCT No.: PCT/GB2017/051963
§ 371 (c)(1),
(2) Date: Jan. 18, 2019

(87) PCT Pub. No.: WO2018/015708
PCT Pub. Date: Jan. 25, 2018

(65) Prior Publication Data

US 2019/0257060 A1 Aug. 22, 2019

(30) Foreign Application Priority Data

Jul. 21, 2016 (GB) .................................. 1612682.3

(51) Int. Cl.
*E03C 1/04* (2006.01)
*E03C 1/02* (2006.01)
*F16K 11/22* (2006.01)
*E03C 1/042* (2006.01)

(52) U.S. Cl.
CPC ............ *E03C 1/021* (2013.01); *E03C 1/0401* (2013.01); *E03C 1/042* (2013.01); *F16K 11/22* (2013.01)

(58) Field of Classification Search
USPC ...................................................... 137/625.4
See application file for complete search history.

(56) References Cited

U.S. PATENT DOCUMENTS 8,112,832 B2 * 2/2012 Hecker ................. E03C 1/0401 4/675
2008/0098515 A1 * 5/2008 Yang .................... E03C 1/0401 4/678

FOREIGN PATENT DOCUMENTS

| GB | 2407138 | 4/2005 |
|---|---|---|
| GB | 2457007 | 8/2009 |
| WO | WO2010/038036 | 4/2010 |

OTHER PUBLICATIONS

EP International Search Report re Application No. PCT/GB2017/051963; 2 pages.

* cited by examiner

*Primary Examiner* — John Fox
(74) *Attorney, Agent, or Firm* — Foley & Lardner LLP

(57) ABSTRACT

A mixer valve (1) comprising a body (2) and at least one inlet (14) adapted to be connected to a fluid supply, the inlet (14) comprising a connector (6) arranged to be connectable to a fluid supply pipe (10) projecting from a mounting surface, and an adjustment means arranged to adjust a position of the connector (6) relative to the mounting surface.

6 Claims, 3 Drawing Sheets

1 44 4 2 14 3 6 12 46 8 14 22

MIXER VALVE HAVING AN ADJUSTMENT SPACER

CROSS-REFERENCE TO RELATED PATENT APPLICATIONS

This application is a U.S. National Stage of International Application No. PCT/GB2017/051963, filed Jul. 4, 2017, which claims priority to and the benefit of Great Britain Patent Application No. 1612682.3, filed Jul. 21, 2016, each of which is incorporated herein by reference in its entirety.

BACKGROUND

This invention relates to plumbing fixtures and particularly to faucets. Invention has particular, but not exclusive, application to mixer valves such as may be used for shower systems.

A mixer valve may have separate inlets for connection to supplies of hot and cold water and may have an outlet for connection to a showerhead such as a handset or a spray head.

When a mixer valve is fitted in a new installation, the location and spacing of the hot and cold water supply pipes can be adjusted and arranged to be suitably spaced for connection to the hot and cold water inlets of the mixer valve and to project out of the wall by a suitable distance. A problem that can arise when replacing a mixer valve in an existing installation is that the projection of the water supply pipes from the mounting surface may not be suitable for connection to the inlets of the new mixer valve.

It is desirable to provide a mixer valve which can be connected to a multiplicity of inlet supplies both as a new fit and in fitting a new mixer valve to existing supply pipes.

An object of the invention is to overcome or at least to mitigate the aforementioned problem.

SUMMARY

According to a first aspect of the invention there is provided a mixer valve comprising a body and at least one inlet adapted to be connected to a fluid supply, the inlet comprising a connector arranged to be connectable to a fluid supply pipe projecting from a mounting surface, and an adjustment means arranged, in use, to adjust a position of the connector relative to the mounting surface.

Preferably the adjustment means comprises at least one spacer. A set of spacers may be provided.

Preferably one or more of the set of spacers may be inserted between the body and the mounting surface in order to achieve a desired spacing between the connector and the mounting surface.

The mixer valve may further comprise a mounting plate adapted to be securable to the mounting surface. Desirably the body is securable to the mounting plate. Preferably the body can be attached to and detached from the mounting plate. Preferably one or more of the set of spacers may be inserted between the mounting surface and the mounting plate of the mixer valve. A rear end of the body may have a recess within which the mounting plate is located.

Preferably the set of spacers comprises a number of spacers each of which may be arranged to be connectable to the mounting plate. The spacers may increase a distance between the mounting surface and the mounting plate. Preferably the spacers are adapted to be positioned between the mounting plate and the mounting surface in order to adjust the position of the connector relative to the mounting surface.

This arrangement enables a mixer valve having at least one inlet to be connected to fluid supply pipes which project from the wall by a variety of different distances between a minimum distance and a maximum distance. The distance of the connector from the mounting surface may be adjusted using the spacers between the mounting surface and the mounting plate to provide a secure connection between the connector and the fluid supply pipe.

Desirably the set of spacers are arranged to provide a connection range of from 3 mm to 20 mm or more preferably from 5 mm to 20 mm or most preferably from 7 mm to 15 mm. The set may comprise a number of spacers of different thicknesses such that a desired number of spacers may be selected to provide the desired distance between the connector and the mounting surface.

It may be that the mounting plate is connectable to the mounting surface by means of one or more screws which may be arranged to pass through one or more apertures in the mounting plate. The one or more apertures in the mounting plate may also be countersunk to allow fixing screws to be seated flush within the mounting plate. A rear end of the body may be fixed to the mounting plate by means of a fastening screw between the body and the mounting plate. The fastening screw may be a grub screw located in a hole in the body.

Preferably the spacers are connectable to the mounting plate between the mounting plate and the mounting surface. In a preferred embodiment the spacers each have one or more apertures arranged to correspond with the or each aperture in the mounting plate and through which the fixing screws are arranged to pass. Desirably the mounting plate and the spacers each have a plurality of apertures. In a preferred embodiment there are at least two apertures and most preferably two apertures.

The set of spacers may comprise a number of spacers each having a different thickness. Preferably spacers are provided having a thickness of from 0.5 mm to 10.0 mm and preferably from 1.0 mm to 8.0 mm and most preferably from 1.0 mm to 4.0 mm. In a particularly preferred embodiment a set of spacers is provided comprising at least one spacer having a thickness of 1 mm, at least one spacer having a thickness of 3 mm and at least one spacer having a thickness of 4 mm. It may be desirable to use a combination of variable thicknesses and a selected number of spacers to achieve the desired distance between the end of the or each connector and the mounting surface.

Insertion of one or more spacers between the mounting plate and the mounting surface may displace the rear end of the body of the mixer valve from the mounting surface by from 0.5 mm to 20 mm and preferably by from 0.5 mm to 15 mm and more preferably by from 0.5 mm to 10 mm. In a most preferred embodiment the displacement may be adjusted by from 0.5 mm to 8.0 mm.

The or each spacer may be in the form of an annular element, for example a ring or disc. Preferably a diameter of the annular element is the same as a diameter of the body of the mixer valve.

In some embodiments at least one of the spacers may have a central portion that is cranked and offset relative to an outer portion. Preferably a diameter of the cranked portion is such as to allow one or more spacers to be located over the cranked portion. The offset may be such that a combination of the spacers has an intermediate thickness such as 1.5 mm. Desirably the offset is about 0.5 mm. In some embodiments the offset may form a recess on an opposing side of the spacer. The recess may be adapted to engage with an offset portion of another spacer.

In some embodiments the spacer or spacers may be flat.

The mixing valve may further comprise an annular collar. The annular collar may be arranged to encircle and to be slidable over the body of the mixer valve, particularly the first end of the body. Desirably the annular collar may be used to cover the spacers used to achieve the desired distance between the mounting surface and the fluid supply valve and provide a suitable aesthetic appearance. The collar may also encircle the spacers between the base of the body and the mounting surface and may provide a suitable aesthetic appearance. The collar may have a depth of up to 20 mm or more preferably up to 10 mm. Desirably the collar may be arranged to be slidable over the body of the mixer valve. The collar or the mixer valve may be arranged such that the collar can be slid off the body if it is not required. The collar may be a push fit over the spacers.

An outer surface of the collar may be provided with a surface finish matching that of the mixer valve body. In a preferred embodiment the collar has a chrome finish. The collar may have an alternative finish matching that of the body of the mixer valve.

Desirably the mixer valve may have more than one inlet, each inlet having a connector with an end arranged to be connectable to a respective fluid supply pipe. In a preferred embodiment the connectors are adjustable such that the connectors can be fixed to fluid supply pipes having a range of spacings between the fluid supply pipes. The connector may have a sliding connection arranged to slide within an external opening in the housing. A nipple arranged to connect to a fluid supply pipe may be provided on a slider moving within the connector.

Each sliding connection may be arranged to allow movement so as to be able to fit to fluid supply pipes having a typical spacing of from 108 mm to 155 mm. Such a spacing is exemplary and is not intended to be limiting.

Desirably the mixer valve body comprises two ports each in fluid connection with an adjustable connector. In a desired embodiment the mixer valve body has inlet ports on opposing sides thereof. In use the fluid inlets of the adjustable connectors may be arranged to be connected to the fluid supply pipes projecting from the mounting surface.

According to a second aspect of the invention there is provided a mixer valve comprising a body and at least one inlet adapted to be connected to a fluid supply, the inlet comprising a connector arranged to be connectable to a fluid supply pipe projecting from a mounting surface, and an adjustment means arranged to adjust a position of the body relative to the mounting surface.

Preferably the adjustment means comprises at least one spacer. A set of spacers may be provided.

Preferably one or more of the set of spacers may be inserted between the body and the mounting surface in order to achieve a desired spacing between the body and the mounting surface.

The mixer valve may further comprise a mounting plate adapted to be securable to the mounting surface. Desirably the body is securable to the mounting plate. Preferably the body can be attached to and detached from the mounting plate. Preferably one or more of the set of spacers may be inserted between the mounting surface and the mounting plate of the mixer valve.

Preferably the set of spacers comprises a number of spacers each of which may be arranged to be connectable to the mounting plate. The spacers may increase a distance between the mounting surface and the mounting plate. Preferably the spacers are adapted to be positioned between the mounting plate and the mounting surface in order to adjust the position of the connector relative to the mounting surface.

This arrangement enables a mixer valve having at least one inlet to be connected to fluid supply pipes which project from the wall by a variety of different distances between a minimum distance and a maximum distance. The distance of the connector from the mounting surface may be adjusted using the spacers between the mounting surface and the mounting plate to provide a secure connection between the connector and the fluid supply pipe.

Desirably the set of spacers are arranged to provide a connection range of from 3 mm to 20 mm or more preferably from 5 mm to 20 mm or most preferably from 7 mm to 15 mm. The set may comprise a number of spacers of different thicknesses such that a desired number of spacers may be selected to provide the desired distance between the connector and the mounting surface.

It may be that the mounting plate is connectable to the mounting surface by means of one or more screws which may be arranged to pass through one or more apertures in the mounting plate. The one or more apertures in the mounting plate may also be countersunk to allow fixing screws to be seated flush within the mounting plate. A rear end of the body may be fixed to the mounting plate by means of a fastening screw between the body and the mounting plate. The fastening screw may be a grub screw located in a hole in the body.

Preferably the spacers are connectable to the mounting plate between the mounting plate and the mounting surface. In a preferred embodiment the spacers each have one or more apertures arranged to correspond with the or each aperture in the mounting plate and through which the fixing screws are arranged to pass. Desirably the mounting plate and the spacers each have a plurality of apertures. In a preferred embodiment there are at least two apertures and most preferably two apertures.

The set of spacers may comprise a number of spacers each having a different thickness. Preferably spacers are provided having a thickness of from 0.5 mm to 10.0 mm and preferably from 1.0 mm to 8.0 mm and most preferably from 1.0 mm to 4.0 mm. In a particularly preferred embodiment a set of spacers is provided comprising at least one spacer having a thickness of 1 mm, at least one spacer having a thickness of 3 mm and at least one spacer having a thickness of 4 mm. It may be desirable to use a combination of variable thicknesses and a selected number of spacers to achieve the desired distance between the end of the or each connector and the mounting surface.

Insertion of one or more spacers between the mounting plate and the mounting surface may displace the rear end of the body of the mixer valve from the mounting surface by from 0.5 mm to 20 mm and preferably by from 0.5 mm to 15 mm and more preferably by from 0.5 mm to 10 mm. In a most preferred embodiment the displacement may be adjusted by from 0.5 mm to 8.0 mm.

The or each spacer may be in the form of an annular element, for example a ring or disc. Preferably a diameter of the annular element is the same as a diameter of the body of the mixer valve.

In some embodiments at least one of the spacers may have a central portion that is cranked and offset relative to an outer portion. Preferably a diameter of the cranked portion is such as to allow one or more spacers to be located over the cranked portion. The offset may be such that a combination of the spacers has an intermediate thickness such as 1.5 mm. Desirably the offset is about 0.5 mm. In some embodiments the offset may form a recess on an opposing side of the spacer. The recess may be adapted to engage with an offset portion of another spacer.

In some embodiments the spacer or spacers may be flat.

The mixing valve may further comprise an annular collar. The annular collar may be arranged to encircle and to be slidable over the body of the mixer valve, particularly the first end of the body. Desirably the annular collar may be used to cover the spacers used to achieve the desired distance between the mounting surface and the fluid supply valve and provide a suitable aesthetic appearance. The collar may also encircle the spacers between the base of the body and the mounting surface and may provide a suitable aesthetic appearance. The collar may have a depth of up to 20 mm or more preferably up to 10 mm. Desirably the collar may be arranged to be slidable over the body of the mixer valve. The collar or the mixer valve may be arranged such that the collar can be slid off the body if it is not required. The collar may be a push fit over the spacers.

An outer surface of the collar may be provided with a surface finish matching that of the mixer valve body. In a preferred embodiment the collar has a chrome finish. The collar may have an alternative finish matching that of the body of the mixer valve.

Desirably the mixer valve may have more than one inlet, each inlet having a connector with an end arranged to be connectable to a respective fluid supply pipe. In a preferred embodiment the connectors are adjustable such that the connectors can be fixed to fluid supply pipes having a range of spacings between the fluid supply pipes. The connector may have a sliding connection arranged to slide within an external opening in the housing. A nipple arranged to connect to a fluid supply pipe may be provided on a slider moving within the connector.

Each sliding connection may be arranged to allow movement so as to be able to fit to fluid supply pipes having a typical spacing of from 108 mm to 155 mm. Such a spacing is exemplary and is not intended to be limiting.

Desirably the mixer valve body comprises two ports each in fluid connection with an adjustable connector. In a desired embodiment the mixer valve body has inlet ports on opposing sides thereof. In use the fluid inlets of the adjustable connectors may be arranged to be connected to the fluid supply pipes projecting from the mounting surface.

According to a third aspect of the invention there is provided a mixer valve comprising a body adapted to be secured to a mounting plate connectable to a mounting surface, and at least one inlet adapted to be connected to a fluid supply pipe projecting from the mounting surface, and adjustment means arranged to adjust a position of the mounting plate relative to the mounting surface.

The mixer valve may comprise any feature of the mixer valve according to the first and second aspects of the invention.

According to a fourth aspect of the invention there is provided a kit comprising at least one of a mixer valve having a body and at least one inlet adapted to be connected to a fluid supply wherein the inlet comprises a connector arranged to be connectable to a fluid supply pipe projecting from a mounting surface in use and an adjustment means arranged to adjust a distance between the connector and the mounting surface.

The kit may comprise any feature of the mixer valve according to the first, second and third aspects of the invention.

According to a fifth aspect of the invention there is provided a method of adjusting a mounting of a mixer valve on a mounting surface the mixer having at least one inlet and a connector being connectable to a fluid supply pipe projecting from the mounting surface in use and the method comprising inserting an adjustment means between the body of the mixer valve and the mounting surface so as to adjust a position of the connector relative to the mounting surface.

The adjustment means may comprise at least one spacer, more preferably a set of spacers, one or more of which may be connected to a mounting plate connectable to the body of the mixer valve in order to adjust a distance between the connector and the mounting surface. A rear end of the body may have a recess within which the mounting plate is located.

Desirably the set of spacers are arranged to provide a connection range of from 3 mm to 20 mm or more preferably from 5 mm to 20 mm or most preferably from 7 mm to 15 mm. The set may comprise a number of spacers of different thicknesses such that a desired number of spacers may be selected to provide the desired distance between the connector and the mounting surface.

In a preferred embodiment the mounting plate is connectable to the mounting surface by means of one or more screws which may be arranged to pass through one or more apertures in the mounting plate. The one or more apertures in the mounting plate may also be countersunk to allow fixing screws to be seated flush within the mounting plate. A rear end of the body may be fixed to the mounting plate by means of a fastening screw between the body and the mounting plate. The fastening screw may be a grub screw located in a hole in the body.

Preferably the spacers are connectable to the mounting plate between the mounting plate and the mounting surface. In a preferred embodiment the spacers each have one or more apertures arranged to correspond with the or each aperture in the mounting plate and through which the fixing screws are arranged to pass. Desirably the mounting plate and the spacers each have a plurality of apertures. In a preferred embodiment there are at least two apertures and most preferably two apertures.

In one embodiment the set may comprise a number of spacers each having a different thickness. Preferably spacers are provided having a thickness of from 0.5 mm to 10.0 mm and preferably from 1.0 mm to 8.0 mm and most preferably from 1.0 mm to 4.0 mm. In a particularly preferred embodiment a set of spacers is provided comprising at least one spacer having a thickness of 1 mm, at least one spacer having a thickness of 3 mm and at least one spacer having a thickness of 4 mm. It may be desirable to use a combination of variable thicknesses and a selected number of spacers to achieve the desired distance between the end of the or each connector and the mounting surface.

Insertion of one or more spacers between the mounting plate and the mounting surface may displace the rear end of the body of the mixer valve from the mounting surface by from 0.5 mm to 20 mm and preferably by from 0.5 mm to 15 mm and more preferably by from 0.5 mm to 10 mm. In a most preferred embodiment the displacement may be adjusted by from 0.5 mm to 8.0 mm.

The or each spacer may be in the form of an annular element, for example a ring or disc. Preferably a diameter of the annular element is the same as a diameter of the body of the mixer valve.

In some embodiments at least one of the spacers may have a central portion that is cranked and offset relative to an outer portion. Preferably a diameter of the cranked portion is such as to allow one or more spacers to be located over the cranked portion. The offset may be such that a combination of the spacers has an intermediate thickness such as 1.5 mm. Desirably the offset is about 0.5 mm. In some embodiments the offset may form a recess on an opposing side of the spacer. The recess may be adapted to engage with an offset portion of another spacer.

In some embodiments the spacer or spacers may be flat.

The mixing valve may further comprise an annular collar. The annular collar may be arranged to encircle and to be slidable over the body of the mixer valve, particularly the first end of the body.

Desirably the annular collar may be used to cover the spacers used to achieve the desired distance between the mounting surface and the fluid supply valve and provide a suitable aesthetic appearance. The collar may also encircle the spacers between the base of the body and the mounting surface and may provide a suitable aesthetic appearance. The collar may have a depth of up to 20 mm or more preferably up to 10 mm. Desirably the collar may be arranged to be slidable over the body of the mixer valve. The collar or the mixer valve may be arranged such that the collar can be slid off the body if it is not required. The collar may be a push fit over the spacers.

An outer surface of the collar may be provided with a surface finish matching that of the mixer valve body. In a preferred embodiment the collar has a chrome finish. The collar may have an alternative finish matching that of the body of the mixer valve.

Desirably the mixer valve may have more than one inlet, each inlet having a connector with an end arranged to be connectable to a respective fluid supply pipe. In a preferred embodiment the connectors are adjustable such that the connectors can be fixed to fluid supply pipes having a range of spacings between the fluid supply pipes. The connector may have a sliding connection arranged to slide within an external opening in the housing. A nipple arranged to connect to a fluid supply pipe may be provided on a slider moving within the connector.

Each sliding connection may be arranged to allow movement so as to be able to fit to fluid supply pipes having a typical spacing of from 108 mm to 155 mm. Such a spacing is exemplary and is not intended to be limiting.

Desirably the mixer valve comprises two ports each in fluid connection with an adjustable connector.

In a desired embodiment the mixer valve comprises a body having inlet ports on opposing sides thereof. The mixer valve is preferably arranged to be mounted on a mounting surface. Desirably fluid supply pipes project from the mounting surface.

In use the fluid inlets of the adjustable connectors may be arranged to be connected to the fluid supply pipes projecting from the mounting surface

BRIEF DESCRIPTION OF THE DRAWINGS

The invention will now be further described by way of example only with reference to the accompanying drawings in which.

DETAILED DESCRIPTION

Figure 1:
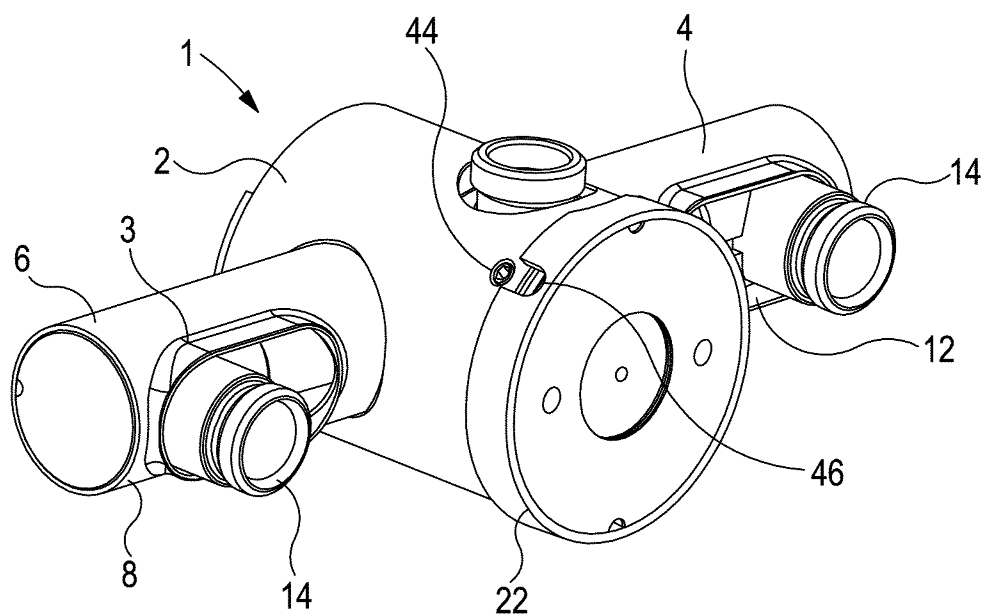
FIG. 1 is a perspective view of a mixer valve in accordance with the invention.
Figure 5:
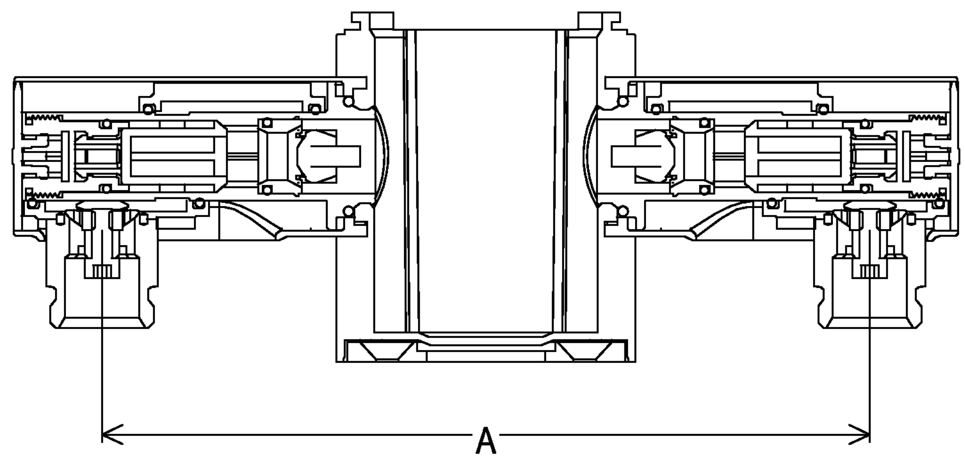
FIG. 5 is a mixer valve in accordance with the invention and arranged to be fitted to rear mounted supply pipes having a relatively wider spacing.
Figure 6:
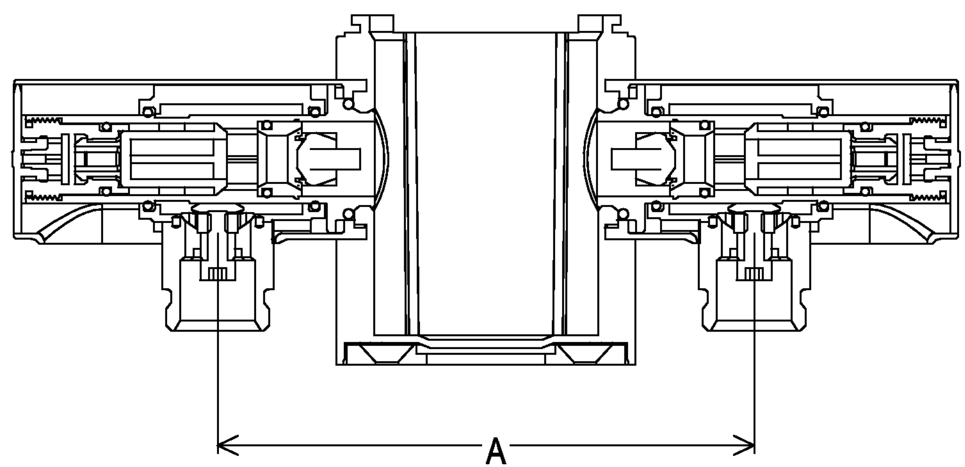
FIG. 6 is a view of the mixer valve of FIG. 1 arranged to be fitted to a rear mounted supply pipes having a relatively narrower spacing.

FIG. 1 illustrates a mixer valve 1 in accordance with the invention and comprising a body 2 arranged to be securable to a mounting surface and having two ports 4 each located on opposing sides of the body and an adjustable connector 6 connected to each port 4 and extending outwardly from the mixer valve body 2. Each connector 6 comprises a housing 8 in which a fluid delivery pipe 10 (see FIG. 4) is located. The housing 8 has an external opening 12 within which a movable fluid inlet 14 is located. An adjustment means is provided to alter a position of the fluid inlets relative to the mounting surface. In FIG. 1 the fluid inlets 14 are positioned within the respective external openings 12 such that a spacing between the fluid inlets is relatively wide. The spacing A can be adjusted so that the mixer valve can be connected to supply pipes having a spacing of from 108 mm to 155 mm. An example of a wide spacing can be seen in FIG. 5 and a narrower spacing in FIG. 6.

FIG. 1 illustrates the mixer valve 1 in which the spacing between the fluid inlets 4 is relatively wide.

The external opening 12 in the housing 8 is arranged to extend a distance such that the nipple 14 can move freely within the opening 12 between a maximum and a minimum adjustment so allowing the valve mixer to be connected to inlet supply pipes which may have variable spacings.

The mixer valve can have two inlets as described with each inlet having a connector with a nipple 14 arranged to be connectable to a respective fluid supply pipe. In a preferred embodiment as described in more detail in our co pending application of the same date the connectors are adjustable such that a distance between the connectors can be adjusted to fix to fluid supply pipes having a range of spacings. Further details of the connector and the sliding arrangement of the connector is described in our co-pending application of even date and will not be described in detail herein.

Figure 2:
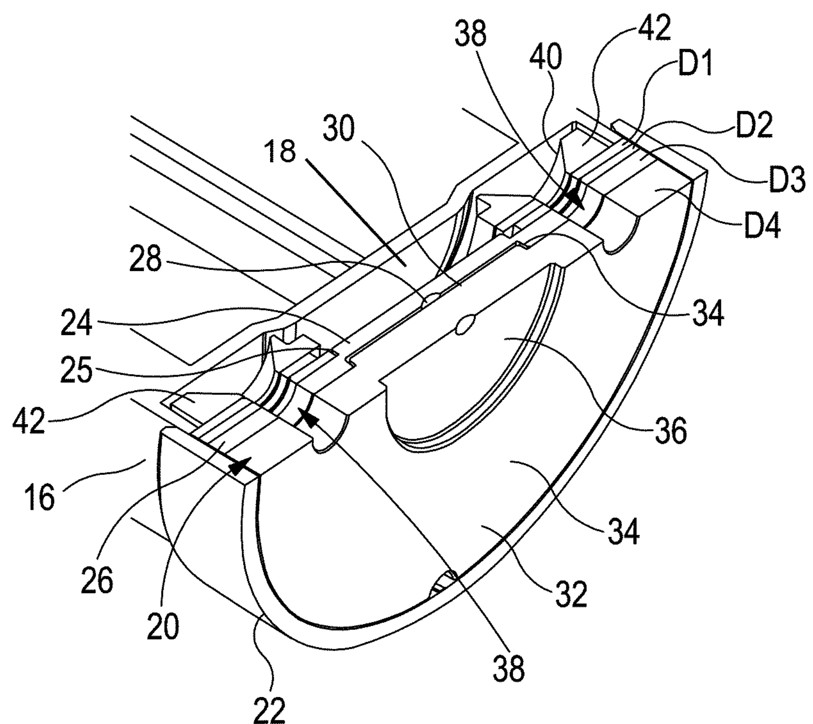
FIG. 2 is a partial cross sectional view of the mixer valve of FIG. 1 with spacers inserted at the first end of the mixer valve body.

FIG. 2 illustrates a partial cross-section of a first or rear end of the body 2 of the mixer valve 1. The rear end of the body 2 forms a mounting portion comprising a base 16 having a recess 18 for reception of a mounting plate 42 to which the rear end of the body 2 can be releasably secured. The mounting plate 42 is adapted to be attached to a mounting surface. In this embodiment, the position of the body 2 and thus the position of the fluid inlets 14 can be adjusted relative to the mounting surface. Adjustment is provided by one or more spacers 20 which are configured to be located between the mounting plate 42 and the mounting surface to vary the distance of the mounting plate 42 from the mounting surface. Each spacer 20 has a substantially circular diameter and has a thickness D1, D2, D3 etc. The spacers may have the same thickness. Alternatively, the spacers may have different thicknesses. For example, spacers can be provided each of which typically have thicknesses of 1 mm, 2 mm, and 4 mm. By choosing a suitable number and combination of spacers a total thickness provided by the spacers can be varied, for example from 1 mm to 8 mm. A collar 22 may be provided on the body of the mixer valve and can be slid into place over the spacers in order to provide a more aesthetic appearance. In this embodiment the collar 22 has a chrome finish that matches a chrome finish on the body of the mixer valve.

Varying the total thickness provide by the spacers allows the distance of the mounting plate 42 from the mounting surface. In this way the position of the mixer valve relative to the mounting surface and thus the distance between the mounting surface and the fluid inlets 14 can be adjusted, for example of from 7 mm up to 15 mm. Accordingly, the mixer valve is able to provide flexibility in adjusting for both a distance of the inlet supply pipes from the mounting surface and also a distance between inlet supply pipes such as hot and cold water supplies.

Figure 3:
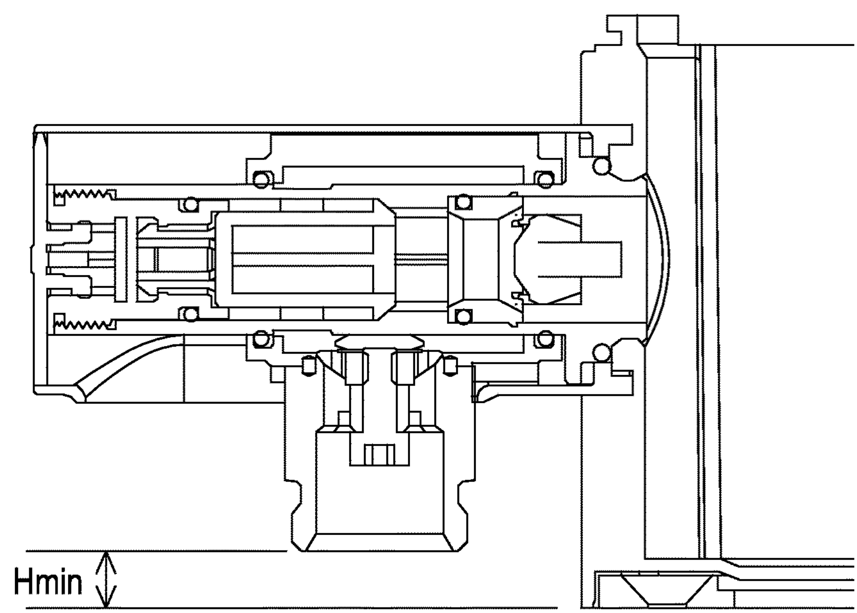
FIG. 3 is a cross sectional view of the mixer valve with a body thereof positioned on a mounting surface without spacers.

FIG. 3 shows the mounting plate attached to the mounting surface without any spacers and the body of the mixer valve secured to mounting plate so that the rear end of the body of the mixer valve is adjacent to and preferably in direct contact with the mounting surface. In this position the mounting plate is received in the recess in the rear end of the body so as to be concealed by the body of the mixer valve and a distance from the nipple 14 to the mounting surface is Hmin. In this embodiment Hmin is 7 mm. It will be appreciated that Hmin is dependent on the shape and arrangement of the mixer valve assembly.

Figure 4:
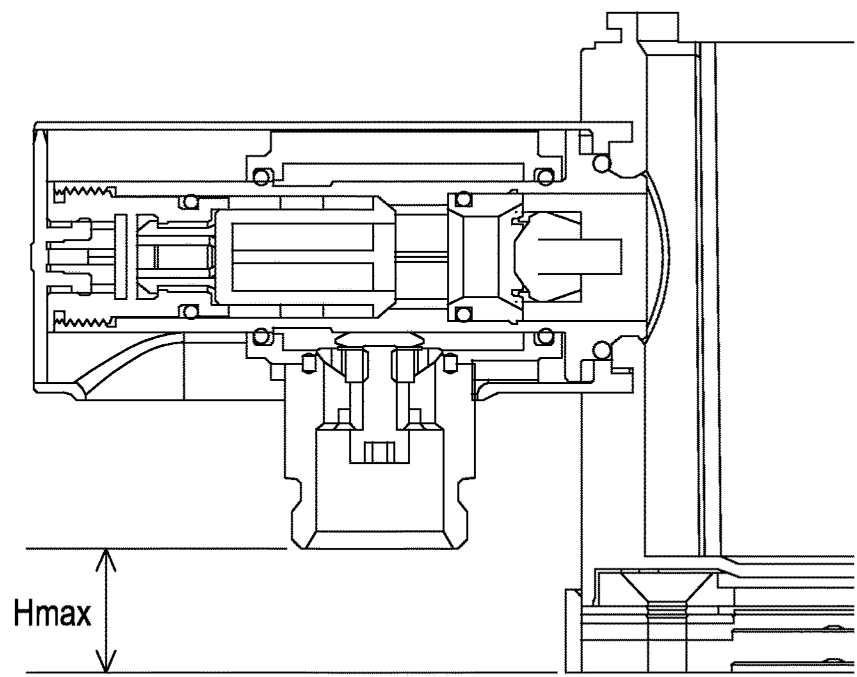
FIG. 4 is a cross sectional view of the mixer valve body positioned on a mounting surface with a number of spacers inserted at a first end of the body.

FIG. 4 shows the mounting plate attached to the mounting surface with a set of spacers between the mounting plate and the mounting surface in order to adjust the distance from the nipple 14 to the mounting surface. In the embodiment illustrated in FIG. 4 the set of spacers comprises four spacers 20 each having a predetermined depth. In FIG. 4 the distance from the nipple to the mounting surface is Hmax. In this embodiment Hmax is 15 mm. It will be appreciated that Hmax is dependent on the number and thickness of the spacers used and it may be desired to have additional spacers available in order to connect the mixer valve to fluid supply pipes protruding an unusually long distance from the mounting surface. It will also be appreciated that the distance from the nipple to the mounting surface may be varied between Hmin and Hmax by section and fitment of one or more spacers to provide the required depth from the mounting surface.

The spacers will now be described in more detail with particular reference to FIG. 2 of the accompanying drawings.

The set of spacers comprises a number of spacers each having a different thickness. In this embodiment the set of spacers comprises two spacers having a thickness of 1 mm, one spacer having a thickness of 2 mm and one spacer having a thickness of 4 mm. It will be appreciated that it is possible to use a combination of thicknesses and a selected number of spacers to achieve the desired distance from the or each nipple to the mounting surface.

A first and a second spacer D1 and D2 are in the form of an annular ring and have a thickness of 1 mm. A third spacer D3 has a disc form and a thickness of 2 mm. A fourth spacer D4 has a disc form and a thickness of 4 mm. A diameter of the spacer discs or rings is substantially the same as a diameter of the body of the mixer valve.

The third disc D3 has a central portion 24 that is cranked and offset 25 relative to an outer portion 26. Preferably a diameter of the cranked portion is such as to allow one or more of the annular spacers to be located over the cranked portion. The offset 25 may be such that a combination of the disc and an annular spacer D2 has an intermediate thickness such as 1.5 mm. The offset is about 0.5 mm.

The offset 25 and cranked portion 26 form a recess 28 on an opposing side of the third spacer D3. The recess is adapted to engage with a projecting portion 30 of another spacer D4.

The fourth spacer D4 has a disk form with an annular outer portion 32 and an offset 34 forming the cranked projecting portion 30. The cranked portion forms a recess 36 on an opposing side of the fourth spacer D4.

Also provided is an optional annular collar 22. In this embodiment the annular collar encircles and is slidable over the body of the mixer valve. The collar may be used to cover the spacers used to achieve the desired depth from the mounting surface and provide a suitable aesthetic appearance. The collar in this embodiment has a depth of 10 mm. The collar is arranged to be slidable over the body of the mixer valve. A retaining ring can be provided but in this embodiment the collar can be slid off the body if it is not required. The collar is a push fit over the spacers. The collar 22 encircles the spacers between the first end and the mounting surface.

In use the collar 22 is slid over the first end of a body of a mixer valve to be mounted and a distance that the mixer valve has to be adjusted is estimated. A suitable number and combination of spacers is selected and inserted in the collar and the fitting checked. Once the spacing of the nipple on the connector is confirmed to be satisfactory relative to the fluid supply pipes the mixer valve can be securely mounted.

Each of the spacers has a first and a second aperture 38 extending through the spacer and arranged to co-locate with corresponding countersunk apertures 40 in the mounting plate 42. Suitable screws (not illustrated) can be located within the apertures 40 of the mounting plate 42 and the apertures 38 of the spacers such that the mounting plate 42 can be fixed to the mounting surface by the screws. The spacers are sandwiched between the mounting plate 42 and the mounting surface and are held in position by the two screws extending through the mounting surface and the spacers.

Once the mounting plate 42 has been secured in place the body of the mixer valve can be secured to the mounting plate by any suitable means such as a grub screw passing through a locating hole 44 in the body and into the mounting plate.

The collar 22 can then be slid into positon over the spacers, providing a suitably aesthetic appearance. A locating slot 46 may be provided in the collar 22 such that the collar can be positioned over the spacers in use and the grub screw can be located in the slot in use.

The invention claimed is:

1. A plumbing fixture comprising:

a body;

at least one inlet connected to the body and adapted to be connected to a fluid supply, the inlet comprising a connector arranged to be connectable to a fluid supply pipe projecting from a mounting surface so as to provide a fluid connection between the fluid supply pipe and the inlet; and an adjustment means arranged to adjust a position of the body and thereby the connector relative to the mounting surface, wherein the adjustment means comprises:

a mounting plate and at least one spacer, the mounting plate being adapted to be securable to the mounting surface, wherein the body can be attached to and detached from the mounting plate, and wherein the at least one spacer is locatable between the mounting surface and the mounting plate; and an annular collar for concealing the at least one spacer, wherein the annular collar is arranged to encircle and to be slidable over the body of the plumbing fixture.

2. The plumbing fixture of claim 1, wherein the at least one spacer comprises a plurality of spacers that are removable from between the mounting plate and the mounting surface such that a distance between the mounting plate and the mounting surface is configured to be adjusted.

3. The plumbing fixture of claim 2, wherein the distance between the mounting plate and the mounting surface can be adjusted between a minimum distance and a maximum distance.

4. The plumbing fixture of claim 3, wherein the minimum distance is provided when the mounting plate is secured to the mounting surface without any of the plurality of spacers.

5. The plumbing fixture of claim 1, further comprising two inlets, each of the two inlets having a connector with an end arranged to be connectable to a respective fluid supply pipe.

6. A method of adjusting a plumbing fixture on a mounting surface, the plumbing fixture comprising a body and at least one inlet connected to the body and a connector being connectable to a fluid supply pipe projecting from the mounting surface so as to provide a fluid connection between the fluid supply and the inlet, the method comprising:

inserting an adjustment means between the body of the plumbing fixture and the mounting surface so as to adjust a position of the body and thereby the connector relative to the mounting surface, the adjustment means comprising:

a mounting plate and at least one spacer, the mounting plate being adapted to be securable to the mounting surface, wherein the body can be attached to and detached from the mounting plate, wherein the at least one spacer is locatable between the mounting surface and the mounting plate, the plumbing fixture further comprising an annular collar for concealing the at least one spacer, wherein the annular collar is arranged to encircle and to be slidable over the body of the plumbing fixture.

* * * * *